Jan. 5, 1932.   C. BREER   1,840,080
DAMPENER
Filed May 12, 1926

INVENTOR.
CARL BREER
BY
ATTORNEY.

Patented Jan. 5, 1932

1,840,080

UNITED STATES PATENT OFFICE

CARL BREER, OF DETROIT, MICHIGAN, ASSIGNOR TO CHRYSLER CORPORATION, OF HIGHLAND PARK, MICHIGAN, A CORPORATION OF DELAWARE

DAMPENER

Application filed May 12, 1926. Serial No. 108,515.

The primary object of my invention is to provide a device that will eliminate synchronous body vibrations in a motor vehicle.

It is another object of my invention to provide a device whereby friction is interposed between two parts of a motor vehicle to eliminate synchronous vibrations between said parts.

A further object of my invention is to dampen by friction the periodic vibrations of a body of a motor vehicle caused by the synchronizing of the body and other parts with the engine impulses.

With the above and other objects in view, my invention consists in the arrangement, combination and construction of the various parts of my improved device, as described in the specification, claimed in my claims and shown in the accompanying drawings, in which:

Figure 1:
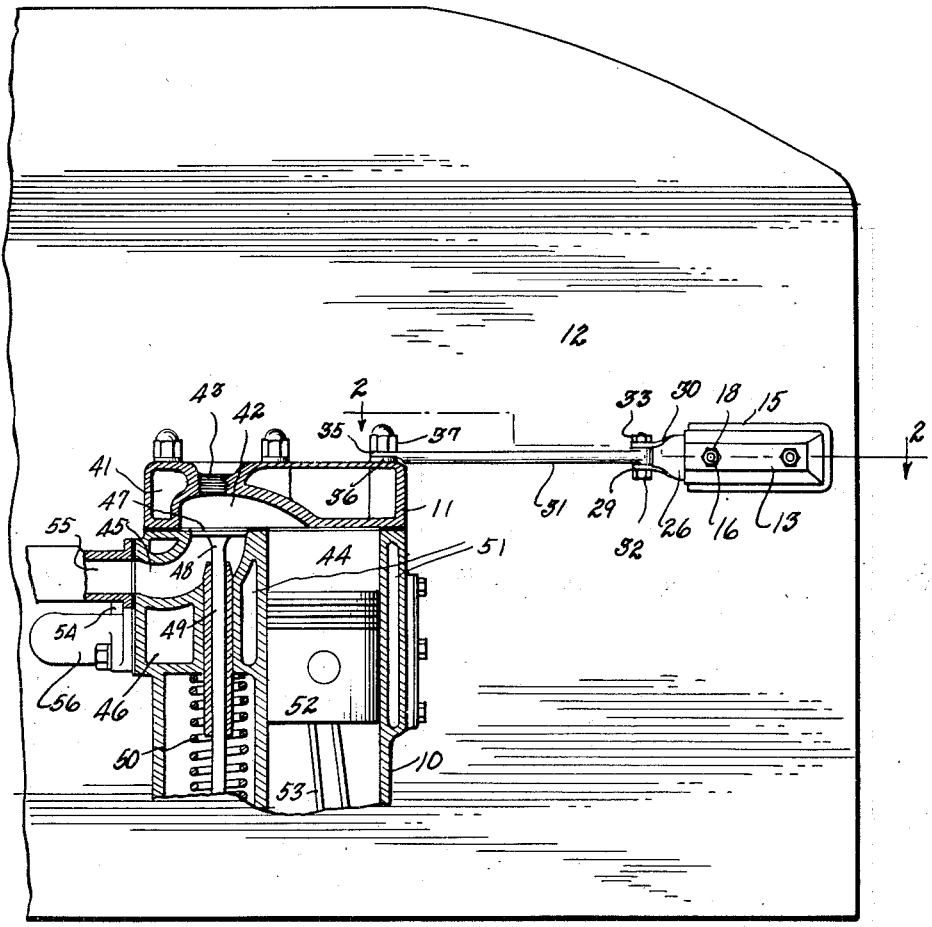
Fig. 1 is a vertical elevation of my improved device attached to a dash of a motor vehicle, the rear portion of an internal combustion engine being shown in section.
Figure 2:
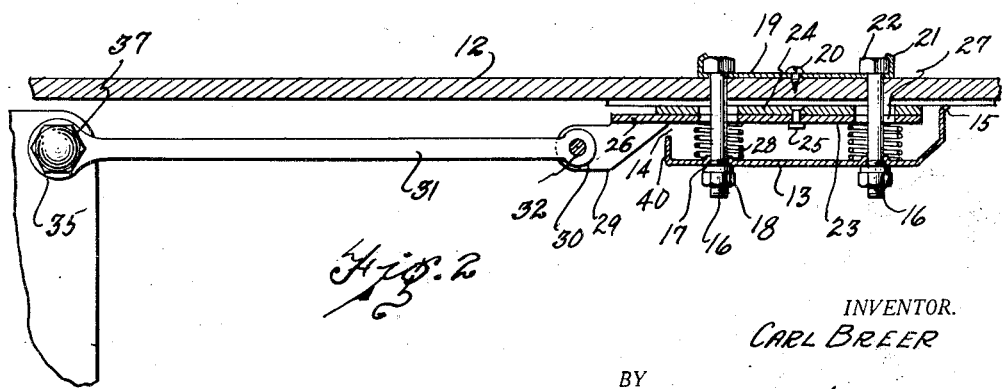
Fig. 2 is a sectional view taken on line 2—2 of Fig. 1.

To properly illustrate the manner in which my improved device is assembled in a motor vehicle, I have shown a section of a rear portion of a conventional cylinder block 10 of an internal combustion engine, having a cylinder head 11 secured thereto. The cylinder block 10 is positioned in front of a conventional dash 12 of an automobile body.

The head 11 is provided with conventional water passages 41, a combustion chamber 42 and a threaded opening 43 for a conventional spark plug not shown. The block 10 has a cylinder 44, an intake passage 45 leading into the combustion chamber 42, an exhaust passage 46, and a valve 47 positioned in the passage 45 by a stem 48 in a guide 49 and a spring 50. Suitable water passages 51 are formed in the block to cool the various parts thereof. A conventional piston 52 with a rod 53 is placed for reciprocation in the cylinder 44. Also secured to the block 10 is a conventional manifold 54 having a passage 55 connected with the intake passage 45 and a passage 56 connected with the exhaust passage 46.

Positioned on the dash 12 is my improved dampener, in the construction of which I provide a housing 13 having the lower portion of one end 40 open as at 14. The housing 13 has a flanged edge 15 bearing against the dash 12 and is held in position by bolts 16, lock washers 17 and nuts 18. The bolts 16 extend through and project from the dash 10 and a plate 19 secured to the dash 12 by screws 20 has its ends 21 bent around a portion of the bolt heads 22 to prevent rotation of the bolts 16.

A plate 23 having a friction lining 24 secured on one side thereof by rivets 25 is placed in the housing 13 with the end portion 26 extending out of the opening 14.

The bolts 16 extend through the center of apertures 27 in the plate 23 and lining 24, leaving a space or clearance between the bolt, plate and lining. Coiled springs 28 having their upper coils bearing against the under side of the housing 13 and their lower coils bearing against the outside of the plate 23, are positioned around the bolts 16 to hold the lining 24 against the dash 12.

The end portion 26 of the plate 23 has flanged sides 29 with aligned apertures therein forming a yoke. Inserted in the yoke between the sides 29 is an eye portion 30 of a rod 31 that is secured by the bolt 32 and nut 33. The other end 35 of the rod 31 is fastened to the cylinder head 11 by a cylinder head stud 36 and nut 37.

In the operation of my improved device when the engine 10 is running the vibratory movement thereof will be conveyed through the rod 31 to the plate 23 and lining 24. The lining 24 being held against the dash 12 by the springs 28 tends to move back and forth. The friction of the lining against the dash 12 will stop body movement and thus prevent the impulses of the engine from causing synchronous vibrations between the body and the engine. The pressure of the springs 28 may be varied as desired to adjust the pressure of the lining 24 against the dash 12 to produce the proper amount of friction to break up the engine vibrations.

The clearance of the apertures 27 around the bolt 16 is sufficient to prevent the bolt 16 coming in contact with the metal plate 23 and the lining 24.

Although I have shown my improved vibration dampener placed between the dash and engine, I desire it to be understood that my improved device may be used between any two parts of an automobile to apply friction to one of the parts, thereby eliminating synchronous vibrations in the parts.

It will be obvious that various changes may be made in the arrangement, combination and construction of the various parts of my improved device without departing from the spirit of my invention and it is my intention to cover by my claims such changes as may be reasonably included within the scope thereof.

What I claim is:

1. In combination, an automobile body having a dash, an engine and means attached to said dash and adjacent the top of said engine adapted to set up friction to eliminate synchronous vibrations in said body caused by the impulses of said engine.

2. In combination, an automobile body having a dash, an engine, a housing secured to said dash, and reciprocating means placed in said housing and connected with said engine adapted to cause friction with said dash when said engine is running.

3. In combination, an automobile body having a dash, an engine, a housing secured to said dash, a plate having a friction lining attached thereto positioned in said housing and extending at right angles to a vertical line through said engine adapted for reciprocating movement in said housing, means pressing said lining against said dash and means connecting said plate with said engine.

4. In combination, an automobile body having a dash, an automobile engine, a housing attached to said dash, a plate having a friction lining attached thereto slidably mounted in said housing, coiled springs adapted to press said lining against said dash and means connecting said plate with the top of said engine.

5. In combination, an automobile body having a dash, an automobile engine, a housing, bolts extending through said dash and nuts securing said housing to said dash, means for holding said bolts stationary, a plate having a friction lining attached thereto positioned in said housing, said bolts projecting through apertures in said plate and lining, means for pressing said lining against said dash and means connecting said plate with said engine.

6. A construction as set forth in claim 5 wherein a plate is secured to said dash and the ends of said plate are bent around a portion of the bolt heads to hold said bolts stationary.

7. In combination, an automobile body having a dash, an automobile engine, a housing, a slidable plate extending at right angles to a vertical line through said engine having a friction lining attached thereto in said housing, coiled springs pressing said lining against said dash, means securing said housing to the dash and adapted to vary the pressure of said lining on the dash and means connecting said plates to said engine.

8. In combination, an automobile body having a dash, an automobile engine, a housing secured to said dash, a plate having a portion thereof positioned in said housing and one end thereof extending from said housing, flanged sides on said end portion of the plate forming a yoke, a rod having one end secured to said yoke and the other end secured to said engine head, a friction lining attached to said plate and means pressing said lining against said dash.

9. In a motor vehicle, the combination of two independent parts thereof, a housing, bolts and nuts securing said housing to one of said parts, a strip secured to said part and having its ends bent around a portion of the bolt heads to hold the same stationary, a plate having a friction lining secure thereto positioned in said housing, said bolts projecting through apertures in said plate and lining, means for pressing said lining against said mentioned part and means connecting said plate with the second part.

10. In a motor vehicle, the combination of two independent parts thereof, a housing, bolts and nuts securing said housing to one of said parts, means for holding said bolts stationary, a plate having a friction lining secured thereto, positioned in said housing, said bolts projecting through the center of apertures in said plate and lining, coiled springs placed around said bolts and bearing against said plate and housing to press said lining against said first part, and means connecting said plate with the second part.

11. A construction as set forth in claim 10 wherein said connecting means consists of one end of said plate extending out from said housing, flanged sides on said end portion forming a yoke and a rod having one end thereof secured in said yoke and the other end secured to the second part.

12. In combination with the engine and dash of a motor vehicle, a frictional connection between the upper end of said engine and said dash to damp out torque reactions in said engine.

13. In combination with the engine and dash of a motor vehicle, means for damping relative movement of said engine in respect to said dash, said means comprising members cooperatively associated with said engine and said dash frictionally engaging each other.

14. In combination with the engine and dash of a motor vehicle, means for damping relative movement therebetween comprising a part carried by said engine frictionally engaging a part carried by the dash.

15. In combination with the engine and dash of a motor vehicle, means for damping relative movement therebetween comprising, a part secured against movement to said dash provided with a friction surface, a part secured against movement to said engine provided with a projecting portion bearing against said friction surface, and means for resiliently clamping said projecting portion against said friction surface.

16. In an automobile, an engine, and a vibration dampener comprising a brace having a portion attached to the engine at the top rear end thereof and a portion attached to the dash, whereby oscillations of the engine about its longitudinal axis are opposed.

CARL BREER.